(12) United States Patent
Wang

(10) Patent No.: US 8,726,523 B2
(45) Date of Patent: May 20, 2014

(54) LABOR-SAVING HORTICULTURAL SCISSORS

(75) Inventor: Kuang-Pin Wang, Taichung (TW)

(73) Assignee: Green Guard Industry Ltd., Taichung (TW)

( * ) Notice: Subject to any disclaimer, the term of this patent is extended or adjusted under 35 U.S.C. 154(b) by 216 days.

(21) Appl. No.: 13/345,148

(22) Filed: Jan. 6, 2012

(65) Prior Publication Data

US 2012/0311872 A1 Dec. 13, 2012

(30) Foreign Application Priority Data

Jun. 10, 2011 (TW) .............................. 100210614 U

(51) Int. Cl.
*A01G 3/02* (2006.01)
*B26B 13/00* (2006.01)

(52) U.S. Cl.
USPC .................................. 30/250; 30/245; 30/252

(58) Field of Classification Search
USPC ........... 30/186, 187, 188, 189, 190, 191, 244, 30/245, 250, 251, 252
See application file for complete search history.

(56) References Cited

U.S. PATENT DOCUMENTS

| | | | | | |
|---|---|---|---|---|---|
| 248,996 | A | * | 11/1881 | Burdick | 83/580 |
| 2,385,835 | A | * | 10/1945 | Neal | 30/250 |
| 2,647,312 | A | * | 8/1953 | Neal | 30/189 |
| 2,682,795 | A | * | 7/1954 | Neal | 81/383.5 |
| 2,816,359 | A | * | 12/1957 | Benton et al. | 30/239 |
| 4,058,893 | A | * | 11/1977 | Boyajian | 30/250 |
| 5,570,510 | A | * | 11/1996 | Linden | 30/250 |
| 5,689,888 | A | * | 11/1997 | Linden | 30/250 |
| 5,697,159 | A | * | 12/1997 | Linden | 30/250 |
| 6,470,575 | B2 | * | 10/2002 | Huang | 30/250 |
| 7,574,805 | B1 | * | 8/2009 | Lindroth | 30/250 |
| 2012/0311872 | A1 | * | 12/2012 | Wang | 30/252 |

* cited by examiner

*Primary Examiner* — Hwei C Payer
(74) *Attorney, Agent, or Firm* — Muncy, Geissler, Olds & Lowe, P.C.

(57) ABSTRACT

A labor-saving horticultural scissors has a first blade and a second blade. Both blades are respectively disposed with a cutting section and a transmission section. Both blades are mutually pivoted to pivotally rotate to perform cutting motion, wherein a rotatable component leans against the transmission section of at least one of the blades. When both blades mutually pivot, the rotatable component rolls and displaces along the transmission section.

5 Claims, 13 Drawing Sheets

LABOR-SAVING HORTICULTURAL SCISSORS

BACKGROUND OF THE INVENTION

1. Field of the Invention

The present invention relates to a horticultural scissors, and more particularly to a horticultural scissors capable of reducing the abrasion of a pivot and labor-saving.

2. Description of the Related Art

A horticultural scissors is used to trim grasses and trees in a garden and is not easy as well as paper-cut. While cutting plants and branches and leaves with certain thick and big, the scissors must overcome great resistance than that of normal articles. A great loading may occur on a pivot shaft of combining two blades of a conventional horticultural scissors to have a problem of easily wearing the pivot shaft. Consequently, the two blades may be further loosed to influence the cutting function of the conventional horticultural scissors.

SUMMARY OF THE INVENTION

In view of the shortcomings of the prior art, the inventor(s) of the present invention based on years of experience in the related industry to conduct extensive researches and experiments, and finally developed a labor-saving horticultural scissors as a principle objective. When two blades relatively and pivotally swing, the rotation contact between a rotatable component and the blades is utilized to have an effect of reducing abrasion on pivot shafts between two blades.

To achieve the foregoing objective of the invention, the invention provides a labor-saving horticultural scissors having a first blade and a second blade. One ends of the two blades are formed with a cutting section while another ends are formed with a transmission section. The two blades are intersected and mutually pivoted to pivotally rotate, thereby forming cutting motion, the characterized in that: the transmission section of at least one blade is propped by a rotatable component, and when the two blades pivotally rotate to each other, the rotatable component rolls and displaces along the transmission section.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
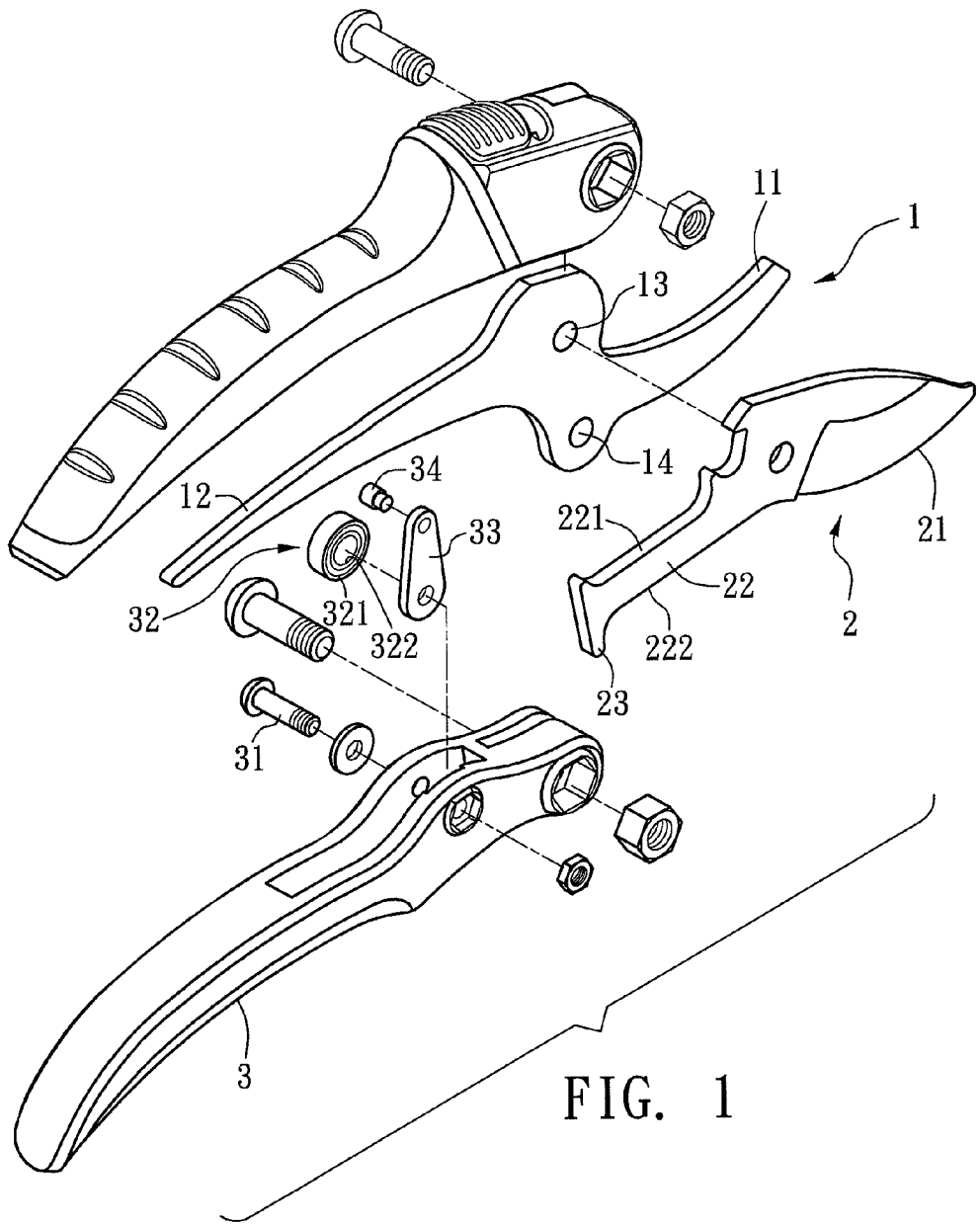
FIG. 1 is a three-dimensional decomposition drawing according to a first embodiment of the invention.
Figure 2:
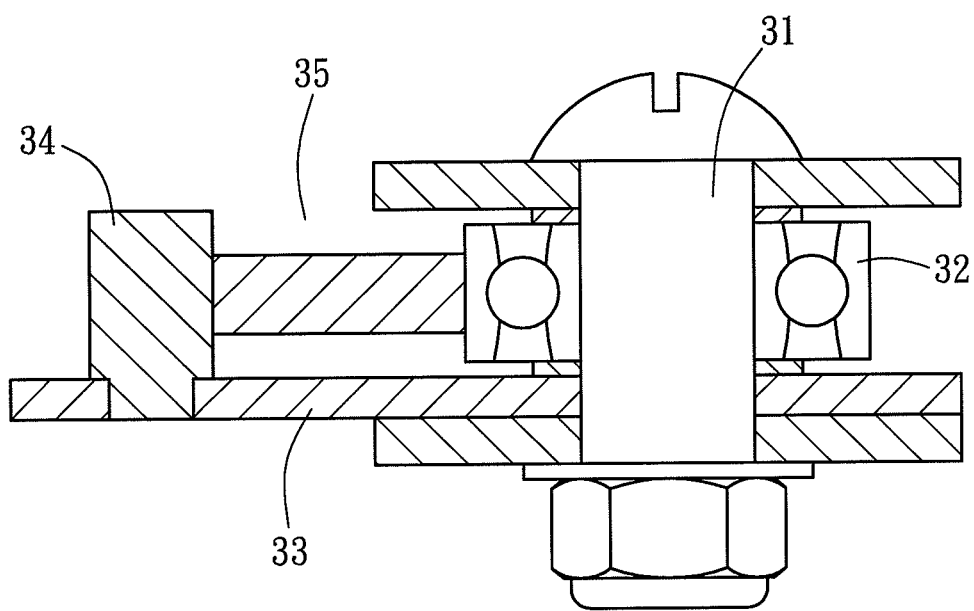
FIG. 2 is a cross-sectional drawing of a pivot state of a rotatable component according to a first embodiment of the invention.

With reference to FIG. 1 and FIG. 2 for a first embodiment of the invention are disclosed. The invented structure includes a first blade 1, wherein its upper section is bent toward a right side and then upwardly formed with a cutting section 11, and its lower section is formed with a transmission section 12 that is longer than that of the cutting section 11. Further, a first pivot portion 13 and a second pivot portion 14 are sequentially disposed toward the cutting section 11 at where the cutting section 11 and the transmission section 12 connect.

A second blade 2 is intersected with the first blade 1 and pivotally connected to the first pivot portion 13. An upper section of the second blade 2 is another cutting section 21 while a lower section of the second blade 2 is a transmission section 22. Further, a first surface 221 that faces the transmission section 12 of the first blade 1 and a second surface 222 that reversely faces the transmission section 12 of the first blade 1 are respectively formed at two side surfaces of the transmission section 22. Moreover, the bottom end of the transmission section 22 of the second blade 2 outwardly protrudes from the second surface 222 to form a baffle portion 23.

A handlebar 3 is pivotally connected to the second pivot portion 14 of the first blade 1 at top thereof, and the handlebar 3 is disposed with a pivot shaft 31 at a proper distance that is distant from the top thereof and near the second blade 2. A rotatable component 32 is pivoted on the pivot shaft 31 to rotate around the pivot shaft 31. The circumference of the rotatable component 32 leans against the second surface 222 of the transmission section 22. An end of the pivot shaft 31 is disposed with a connection plate 33 (as shown in FIG. 2). The connection plate 33 is extended toward a direction crossing the transmission section 22, and a clamping rod 34 is vertically disposed on an end opposite to the end which the connection plate 33 pivotally connected to the pivot shaft 31. An interval 35 is between the rotatable component 32 and the clamping rod 34. The transmission section 22 pierces through the interval 35. The width of the interval 35 is slightly larger than the transmission section 22. Therefore, when the handlebar 3 pivotally rotates relative to the first blade 1 by taking the second pivot portion 14 as an axis, the transmission section 22 of the second blade 2 is propped and pushed by the rotatable component 32 or the clamping rod 34 to drive the second blade 2 to rotate pivotally by taking the first pivot portion 13 as an axis.

In the embodiment, the rotatable component 32 is a ball bearing having an inner ring 322 and an external ring 321. The external ring 321 can rotate around the inner ring 322 through the rolling of the ball, and the external ring 321 of the rotatable component 32 roll on the second surface 222 to generate the displacement. Since the ball bearing generates displacement in a manner of rolling on the contact surface propped by the external ring 321, the abrasion of the contact surface between both can be reduced. The force received loading of the pivot place (as the first pivot portion 13) between the first blade 1 and the second blade 2 can be further shared such that the invention may not be easily damaged.

Figure 3:
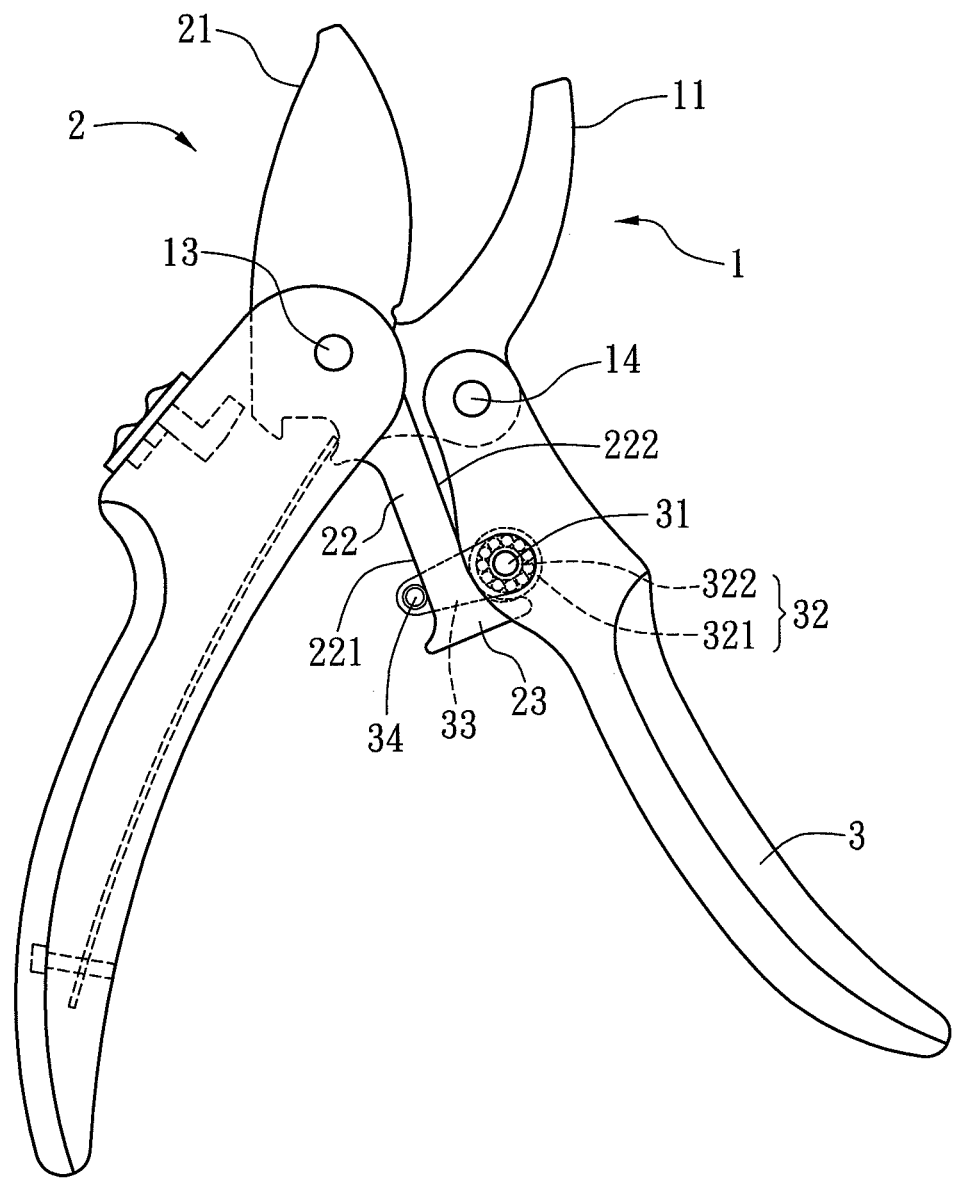
FIG. 3 and FIG. 4 are schematic diagrams of two using states according to a first embodiment of the invention.
Figure 4:
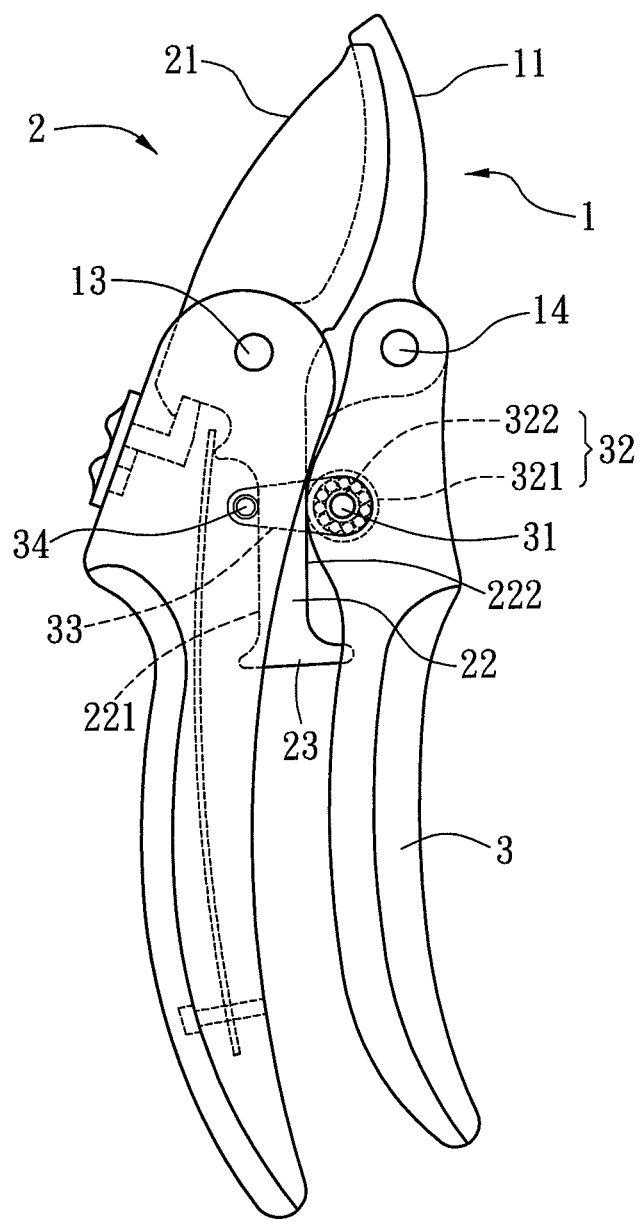

When the invention is actually used, as shown in FIG. 3 to FIG. 4, in the pivot process of imposing the force to press the handlebar 3 and the transmission section 12 of the first blade 1, the handlebar 3 pushes the transmission section 22 of the second blade 2 through the circumference of the rotatable component 32, wherein the circumference of the rotatable component 32 rotates on the second surface 222 of the transmission section 22 and upwardly displaces along the second surface 222 at the same time. The second blade 2 pivotally rotates by taking the first pivot portion 13 as an axis, thereby forming cutting motion.

While separating the handlebar 3 and the transmission section 12 of the first blade 1, the handlebar 3 drives the transmission section 22 of the second blade 2 between the rotatable component 32 and the clamping rod 34 to pivotally rotate by taking the first pivot portion 13 as an axis. In this motion, the clamping rod 34 driven by the handlebar 3 leans against the first surface 221 of the transmission section 22 and downwardly slides along the first surface 221 such that the second blade 2 generates a pivot swing motion with respect to the first pivot portion 13. When the clamping rod 34 is displaced to a bottom end of the transmission section 22 along the leaning surface, the rotatable component 32 and the clamping rod 34 are respectively baffled by the baffle portion 23 without coming off.

Figure 5:
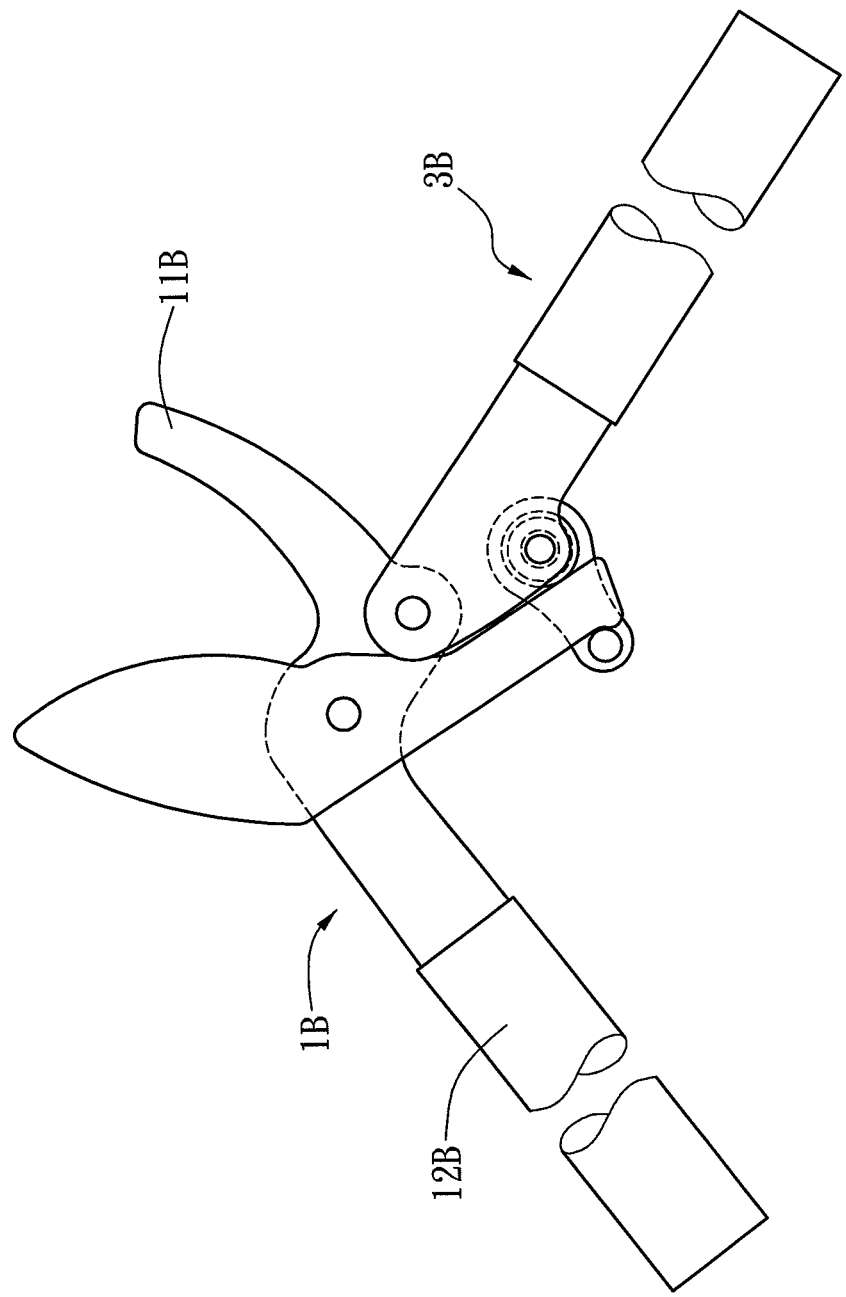
FIG. 5 and FIG. 6 are schematic diagrams of two using states according to a second embodiment of the invention.
Figure 6:
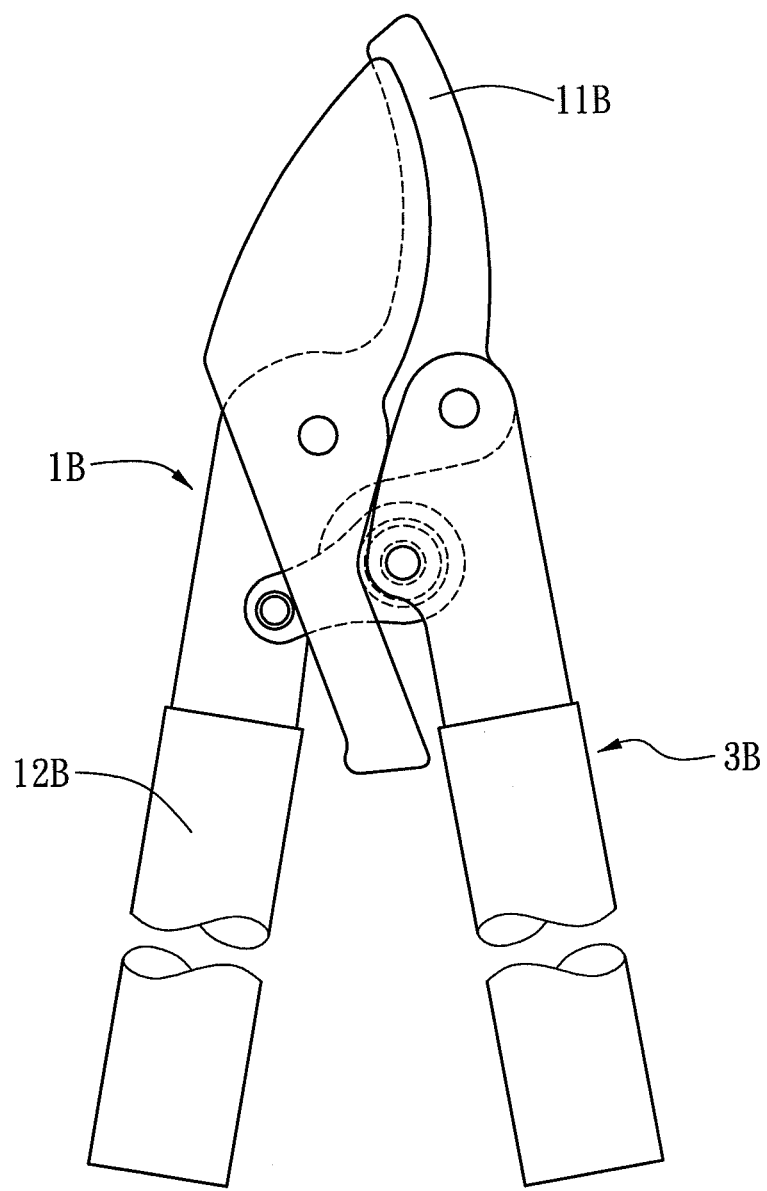

With reference to FIG. 5 to FIG. 6 for a second embodiment is depicted. The difference between the foregoing embodiment and the second embodiment is that the length of the transmission section 12B of the first blade 1B is much longer than that of the cutting section 11B to reduce the burden of force imposed by a user.

Figure 7:
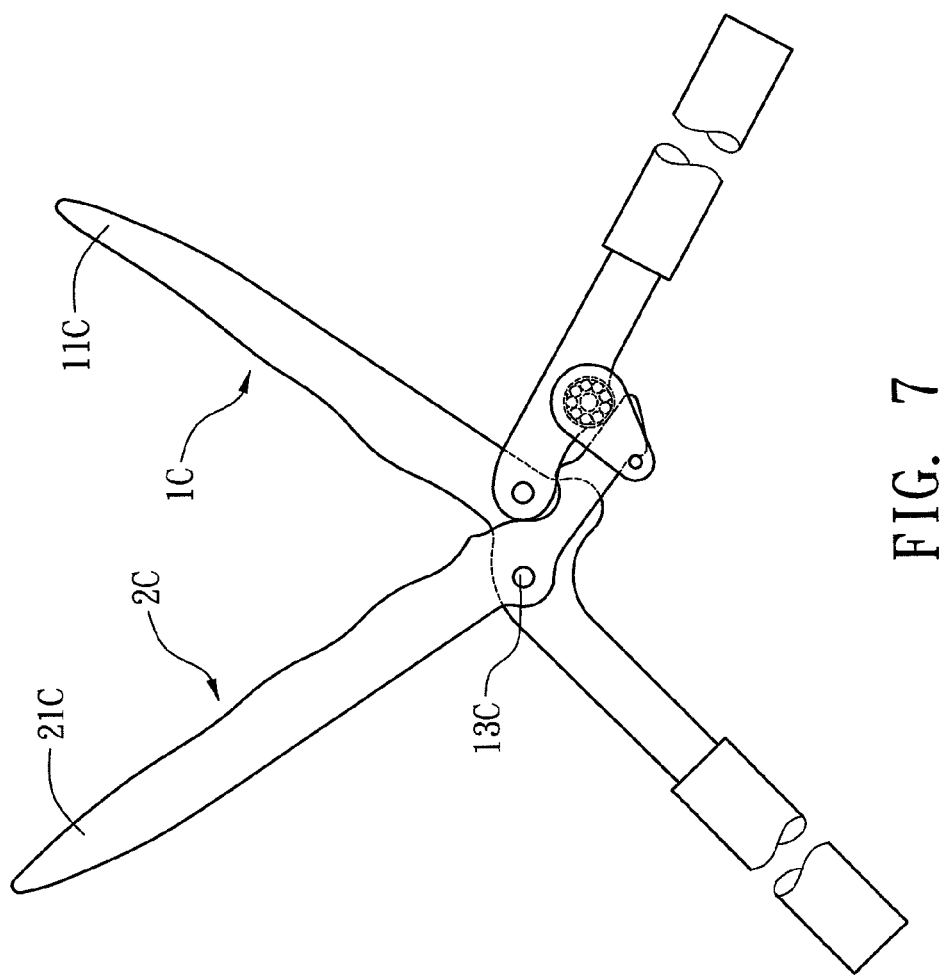
FIG. 7 and FIG. 8 are schematic diagrams of two using states according to a third embodiment of the invention.
Figure 8:
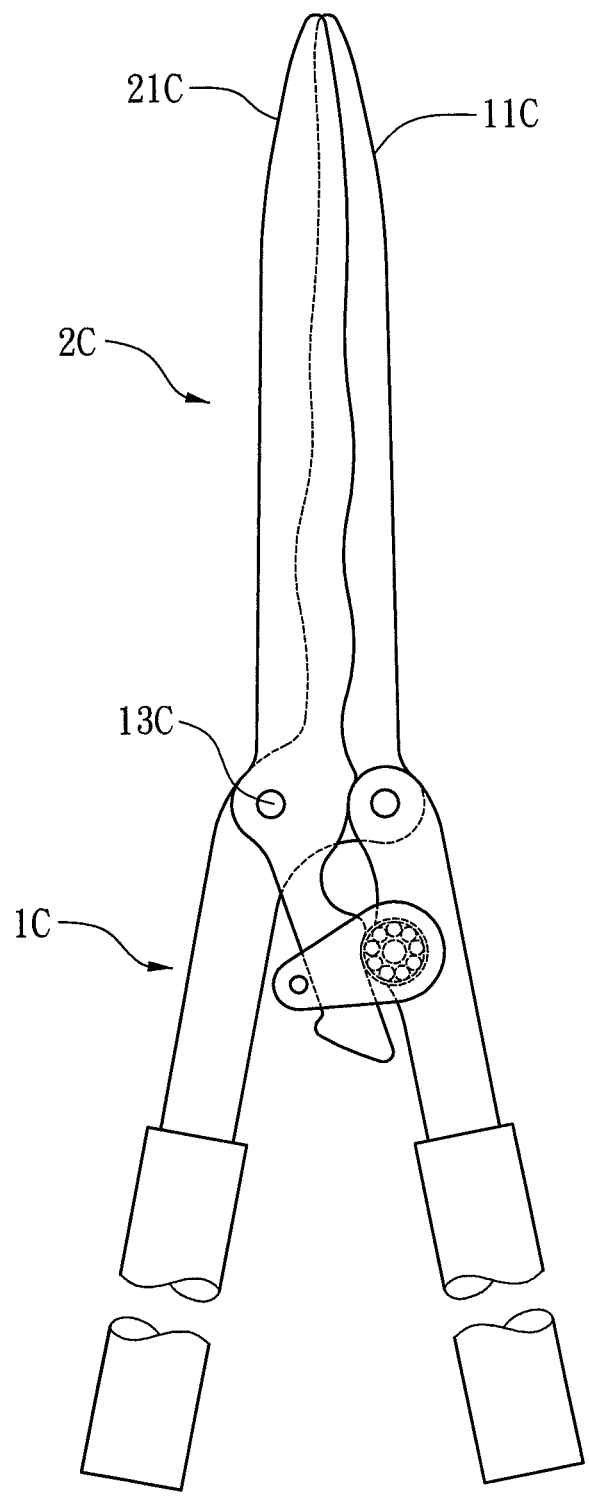

With reference to FIG. 7 to FIG. 8 for a third embodiment is depicted. The embodiment has longer cutting sections 11C, 21C of the first blade 1C and the second blade 2C to increase the cutting range of single cut. However, the design decreases the force received loading of the first pivot portion 13C pivotally connected to the two blades of the horticultural scissors by the performance of the above-mentioned rotatable component although it extends moment arm resistance to increase the loading of the horticultural scissors.

Figure 9:
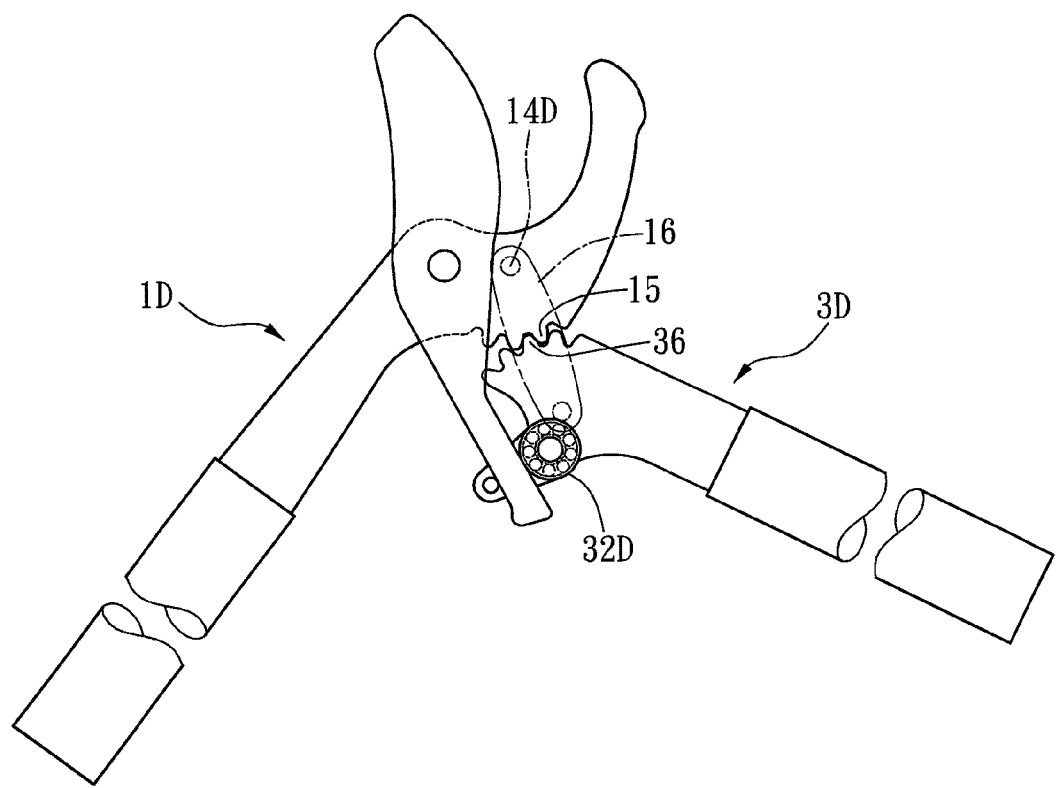
FIG. 9 and FIG. 10 are schematic diagrams of two using states according to a fourth embodiment of the invention.
Figure 10:
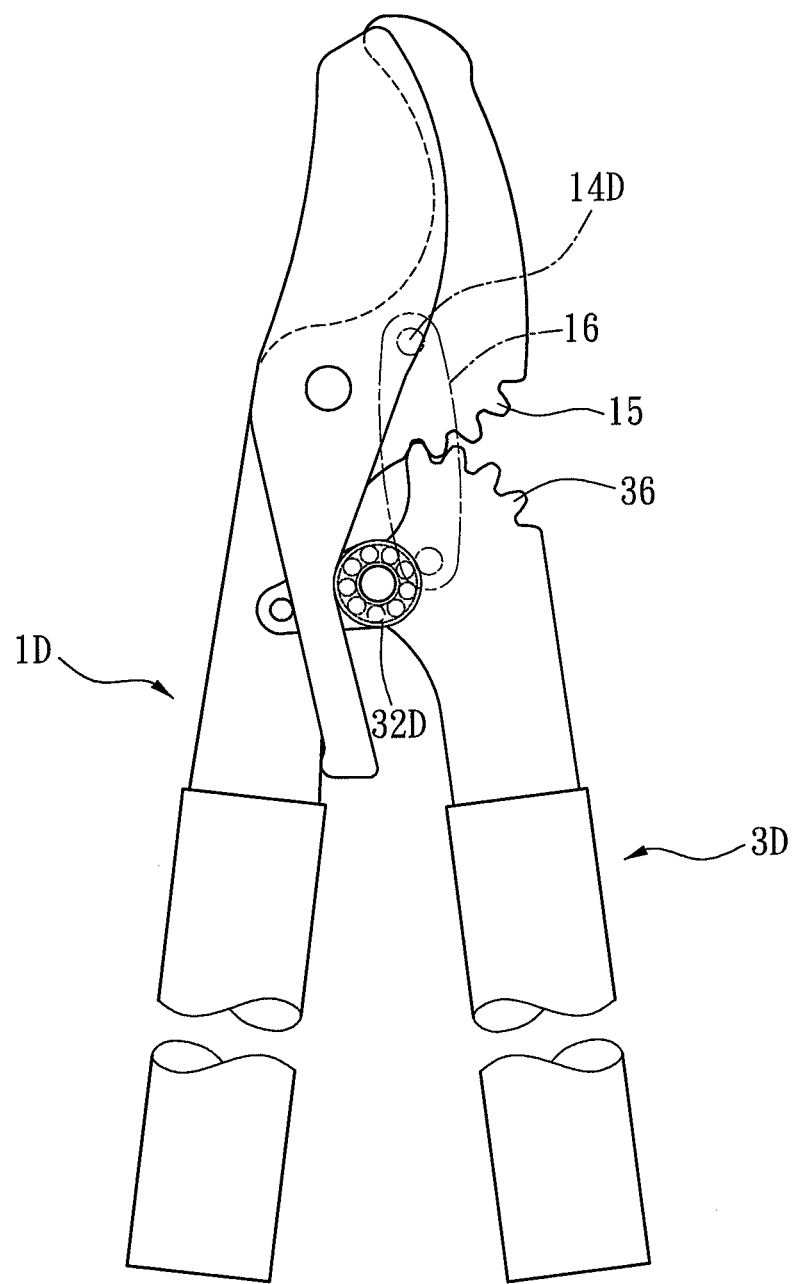

FIG. 9 and FIG. 10 are a fourth embodiment of the invention and take the foregoing second embodiment as a basis. Tooth driving portions 15, 36 mutually engaged are increased at the corresponding place between the handlebar 3D and the first blade 1D so as to mutually drive. Two ends of a pivot member 16 are respectively pivoted at the handlebar 3D and the second pivot portion 14D of the first blade 1D. Accordingly, while cutting branches, received resistance can be further shared by the rotatable component 32D and the tooth driving portions mutually engaged.

Figure 11:
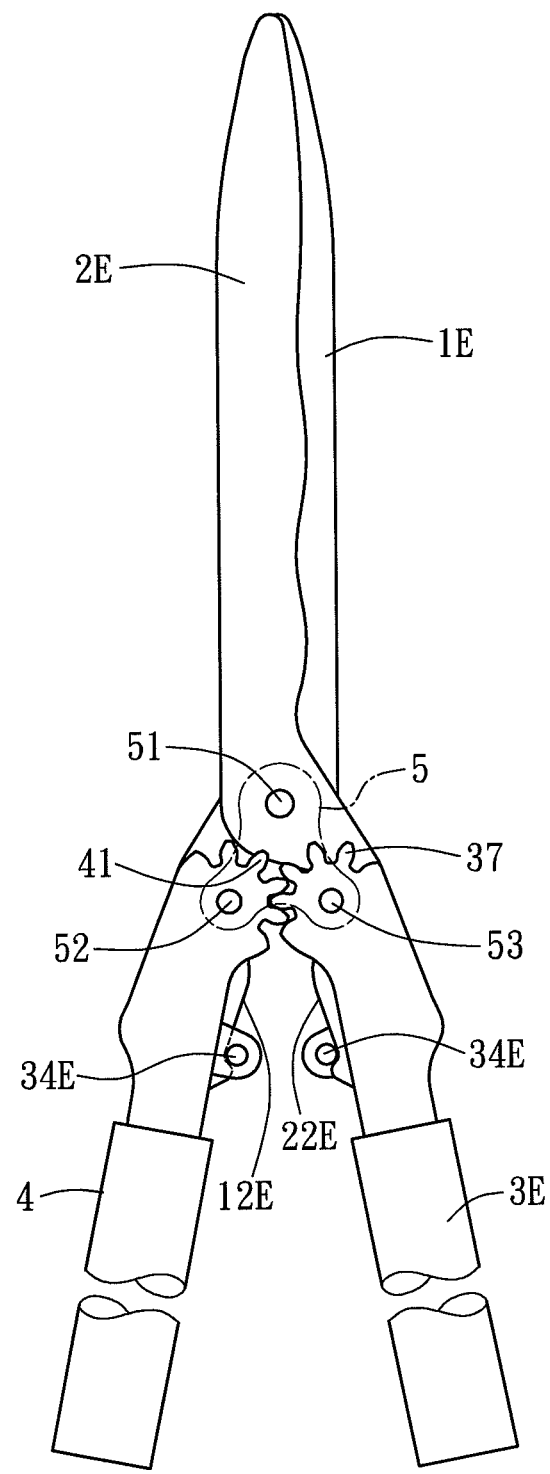
FIG. 11 is a planar schematic diagram according to a fifth embodiment of the invention.
Figure 12:
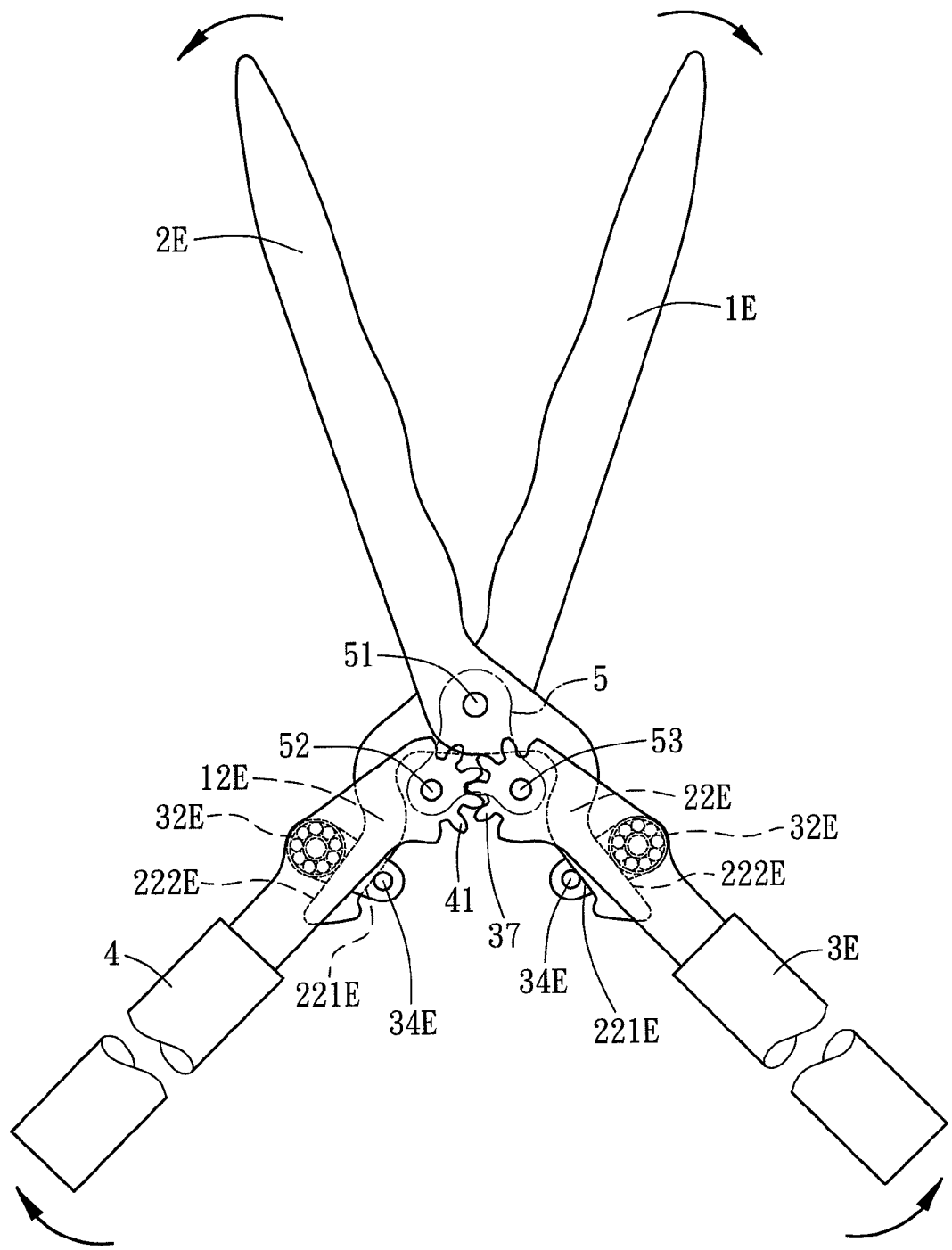
FIG. 12 and FIG. 13 are schematic diagrams of two using states according to a fifth embodiment of the invention.
Figure 13:
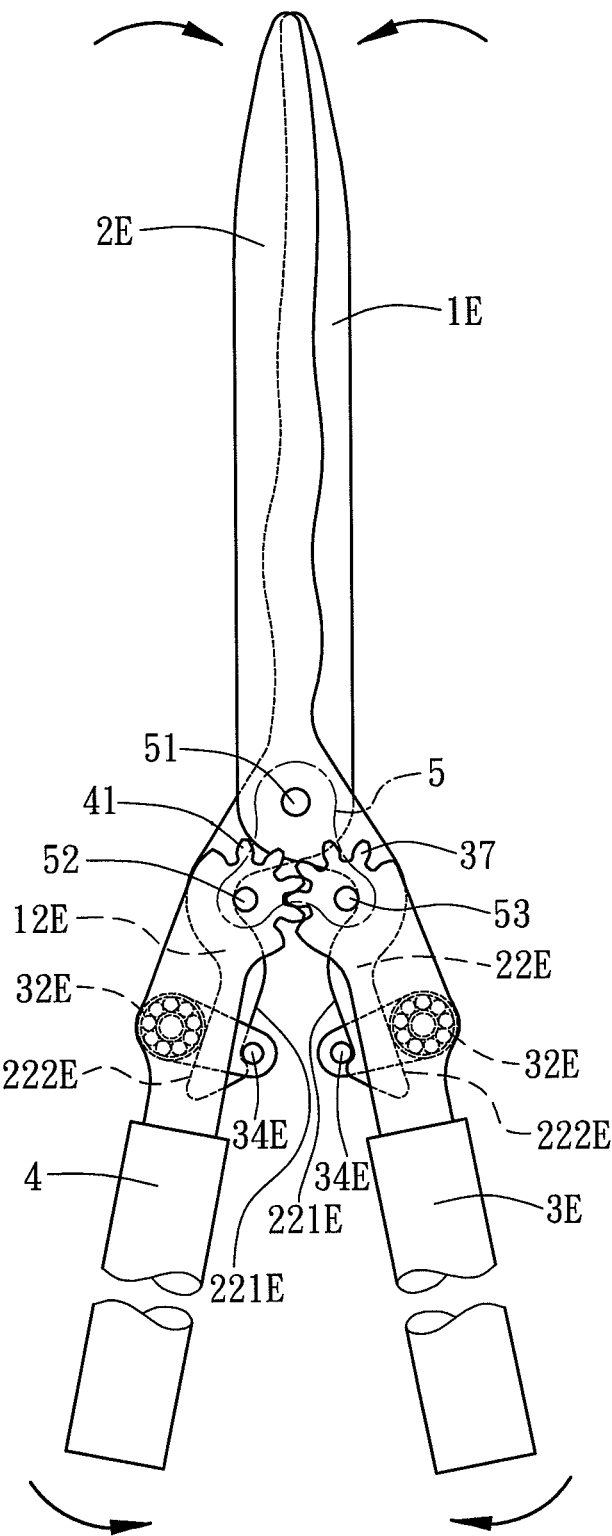

FIG. 11 to FIG. 13 is a fifth embodiment of the invention and takes the foregoing third embodiment as the basis. Two handlebars 4, 3E respectively equipped with the rotatable component 32E and the clamping rod 34E respectively clamp the transmission sections 12E, 22E of the first blade 1E and the second blade 2E, wherein sides, which correspond to each other, of the two transmission sections 12E, 22E are third surfaces 221E while sides, which are opposite to each other, are fourth surfaces 222E. The rotatable component 32E leans against the fourth surface 222E to control the motion of two blades. Tops of the two handlebars 4, 3E are respectively disposed with tooth driving portions 41, 37 that are extended in a radiation shape and are engaged to each other and have a combination plate 5, wherein its end is pivotally disposed with the two blades 1E, 2E through a first pivot shaft 51 while another ends are pivotally disposed at two handlebars 4, 3E through a second pivot shaft 52 and a third pivot shaft 53. By assembling each component, the two handlebars 4, 3E are mutually driven by the tooth driving portions 41, 37 to pivotally rotate through the second pivot shaft 52 and the third pivot shaft 53.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A labor-saving horticultural scissors having a first blade and a second blade, one end of each of the two blades formed with a cutting section while the other end is formed with a transmission section, the two blades intersected and mutually pivoted to pivotally rotate so as to form a cutting motion, characterized in that: the transmission section of at least one of the blades propped by a rotatable component, the rotatable component rolling and displacing along the transmission section of the at least one blade when the two blades mutually pivot, wherein a connection place between the cutting section and the transmission section of the first blade is sequentially disposed with a first pivot portion and a second pivot portion toward the cutting section; and the second blade and the first blade are pivotally connected to the first pivot portion, and two side surfaces of the transmission section of the second blade are respectively formed with a first surface that faces the first blade and a second surface that is opposite to the first blade; and a handlebar is connected to the first blade and rotates relative to the first blade, and the handlebar is disposed with a pivot shaft at a proper distance that is distant from the top thereof; and the rotatable component is pivoted to the pivot shaft and rotates, and one end of the pivot shaft is disposed with a connection plate, and the connection plate is extended toward a direction of crossing the transmission section of the second blade, a clamping rod is vertically disposed on a corresponding end of the connection plate pivotally connected to the pivot shaft such that when the handlebar pivotally rotates toward the first blade by taking the second pivot portion as an axis, the rotatable component pushes the transmission section of the second blade to roll and displace along the second surface and allows the second blade to pivotally rotate by taking the first pivot portion as an axis.

2. The labor-saving horticultural scissors as recited in claim 1, wherein a bottom of the transmission section of the at least one blade propped by the rotatable component further protrudes a baffle portion.

3. The labor-saving horticultural scissors as recited in claim 1, wherein the handlebar is pivotally connected to the second pivot portion of the first blade through a top thereof.

4. The labor-saving horticultural scissors as recited in claim 1, wherein the handlebar is pivoted with a pivot member, and another end of the pivot member is pivotally connected to a second pivot portion of the first blade, and the handlebar and the first blade respectively have a tooth driving portion, and the two tooth driving portions engage to each other such that the handlebar and the first blade mutually drive and pivotally rotate.

5. The labor-saving horticultural scissors as recited in claim 1, wherein the rotatable component is a ball bearing having an inner ring and an external ring, and the external ring capable of being rotated leans against the second surface of the transmission section.

* * * * *